Figure 1:
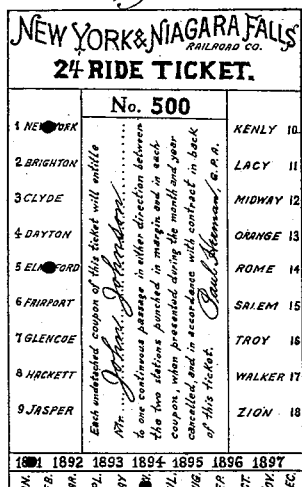

(No Model.) 2 Sheets—Sheet 1.

W. H. CAMPBELL.
RAILWAY TICKET.

No. 468,927. Patented Feb. 16, 1892.

Attest:
Geo H Botts
C. J. Sawyer

Inventor:
William H. Campbell
by
Phelps Munson Phelps & Hoyt
Attys (No Model.) 2 Sheets—Sheet 2.
W. H. CAMPBELL.
RAILWAY TICKET.
No. 468,927. Patented Feb. 16, 1892.
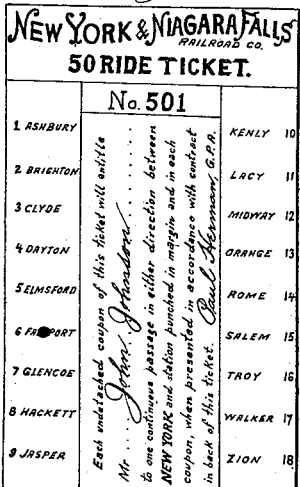
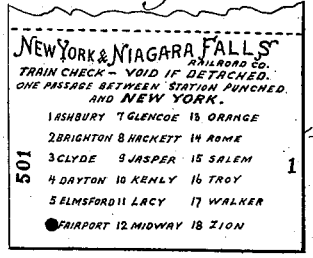
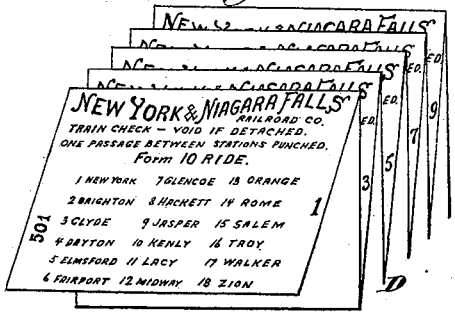
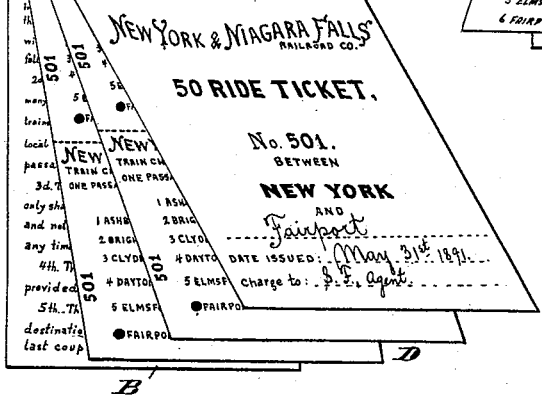

UNITED STATES PATENT OFFICE.

WILLIAM H. CAMPBELL, OF NEW YORK, N. Y.

RAILWAY-TICKET.

SPECIFICATION forming part of Letters Patent No. 468,927, dated February 16, 1892.

Application filed July 1, 1891. Serial No. 398,138. (No model.)

*To all whom it may concern:*

Be it known that I, WILLIAM H. CAMPBELL, a citizen of the United States, residing at New York, county of New York, and State of New York, have invented certain new and useful Improvements in Railway-Tickets, fully described and represented in the following specification and the accompanying drawings, forming a part of the same.

This invention relates to that class of railway-tickets known as "trip-tickets" or "commutation-tickets," which are used by railroads and other transportation companies for the purpose of furnishing passengers traveling regularly over their lines with a convenient form of ticket good for a given number of trips or length of time.

The invention relates especially, however, to tickets of that class known as "commutation-books," in which a certain number of coupons, each representing a ride, are bound together to form a book and generally provided with covers, in which the contract is printed and which form the final voucher for the company after the book is exhausted. The coupons are attached to the covers by wire fasteners, or in any other suitable manner, so as to be easily detached, and the conductors lift a coupon for each ride until the book is exhausted, when the last coupon and covers of the book are taken up together.

The object of my invention is to improve the form of commutation-books, and especially to provide a book which shall be of such a construction as to prevent fraud by the user.

With the books now in use fraud in many ways is possible and largely practiced. For instance, a book between stations far apart is purchased and this book is used up, excepting the last coupon, which is retained, the covers therefore not being taken up by the road. A similar book for the same number of rides, but between two stations a short distance apart, is then purchased, and the pages or coupons of the new book are transferred to the unsurrendered covers of the old book, the purchaser thus being again in possession of a full book good between two stations a long distance apart, while he has purchased only a book good between two stations a short distance apart and costing much less.

The commutation-books now in use are usually printed with blanks for one or both the commutation-stations and the month for which they are sold, so that they can be filled in with pen and ink or rubber stamps at the time of sale, thus obviating the necessity of carrying a full stock of these books between all stations. This also gives opportunity for fraud, as it is found that parties purchase a book good between two stations a short distance apart and then erase the writing or stamping in the blank spaces and substitute the names of stations a long distance apart, or purchase a book good for a short time and then erase the date which has been written or stamped in and substitute a date extending the life of the ticket.

In addition to the disadvantages of the present commutation-books in respect to fraud they are inconvenient in use. The coupons do not show the stations between which the passenger is entitled to travel, this information being given only on the cover of the book, where it is written or stamped in at the time of sale, as previously described. The conductors, therefore, are required on taking a coupon to indorse upon the back the names of the stations between which the passenger is traveling in order that the coupon may form a full record for the company. This necessitates the conductor referring to the cover of the book to ascertain the points between which the passenger is entitled to travel, and the indorsement, being in pencil and written hurriedly while the train is in motion, will naturally be illegible and of little aid in auditing the commutation traffic, while on many occasions when the travel is large the conductors will not have sufficient time to indorse the coupons and the auditing department will be left without any check upon the distance the conductor has allowed the passenger to ride on the coupon taken up. These are some of the objections to the present form of commutation-books; but many others are well known to those skilled in the art, to whom the further advantages of my improved commutation-book will be apparent.

By my invention I provide a commutation-book so constructed that one form can be utilized for a large number of stations embracing all points to which the commutation traffic of a road extends, while furnishing the passengers and conductors with a coupon for each ride which is a complete record of the transaction, including the starting and destination stations. I accomplish this result by providing each of the coupons of my book with a list of commutation-stations, by names or numbers, or both, so that the commutation-stations may be indicated upon each coupon, preferably by punching at the time of sale. I also preferably print upon some part of the book, as the inside of one of the covers, a similar list of the commutation-stations, in which, also, the commutation-station is indicated at time of sale, preferably by punching; but this list may be omitted and the stations written in the book at time of sale. A special book may be printed for important stations and such stations printed on the coupons and cover, so that it will be necessary to indicate at the time of sale only the other station, or the book may be good for all stations and both the commutation-stations indicated on the book and coupons at the time of sale.

Figure 2:
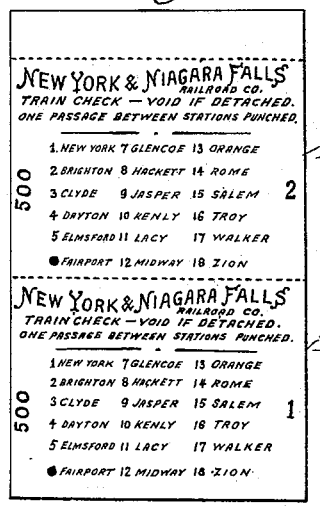
Figure 3:
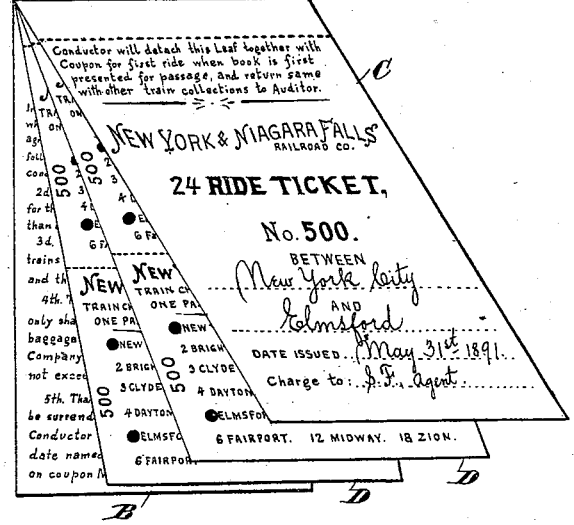
Figure 3:
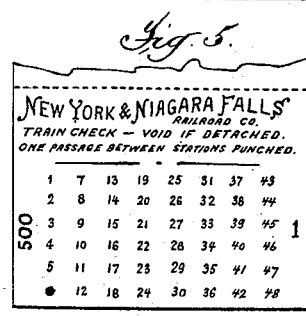

In the accompanying drawings, Figure 1 shows a complete commutation-book constructed in accordance with my invention, with both the commutation-stations indicated at time of sale. Fig. 2 shows a coupon-leaf. Figs. 3 and 4 are views similar to Figs. 1 and 2, showing a book printed for a single station. Fig. 5 shows a modification in which the stations are listed on the coupons by numbers only. Fig. 6 shows a modified form of book.

Referring now to said drawings, A is the top and B the bottom cover of the book, C the fly-leaf or auditor's check, and D a series of coupons. As shown in Figs. 1 and 2, the cover A on the inside bears a list of the commutation-stations by names and numbers, and the contract, with blank space for the name of the purchaser. A list of months and years is added, also, for the purpose of indicating the limit of the ticket. It will be understood, however, that any of this additional matter may be transferred to any other part of the book and the entire top inside of the cover given up to the listing of stations, when they are sufficiently numerous, or the list may be printed elsewhere in the book. Upon the inside of the bottom cover B may be printed any matter desired. As shown, it bears the conditions or restrictions under which the book is sold.

The fly-leaf C forms the auditor's check, and, as shown in Figs. 1 and 2, is filled in at the time of sale with the names of the stations between which the book is good and the date of issue, and such other matter as is desired. This fly-leaf is detached by the conductor when the book is presented for the first ride, and is returned by him to the general office with the first coupon as a part of his daily report.

The coupons D, as shown in Figs. 1 and 2, bear complete lists of commutation-stations by names and numbers, both the commutation-stations between which the ticket is good being indicated on each one, preferably by punching the numbers of the stations, as shown.

In Figs. 3 and 4 a special book for a single important station is shown, only the other station being written in upon the fly-leaf and punched in the cover and coupons at the time of sale.

The use of the ticket will be readily understood from a brief description of the book shown in Figs. 1 and 2. The book No. 500 is sold by the New York and Niagara Falls Railroad Company to Mr. John Johnson, and is good for twenty-four rides between station No. 1 (New York) and station No. 5 (Elmsford) during the month of June, 1891. When the ticket is sold, the starting and destination stations (New York and Elmsford) and the month and year (June, 1891) are punched out on the top cover A, the name of the purchaser written in the blank provided for this purpose, the same stations and date of issue written in the blank spaces on the fly-leaf, and the numbers of the stations (New York and Elmsford) are punched on all the coupons.

It will readily be seen that the manipulation of the commutation-tickets in the manner previously described is thus effectively prevented and the present objections to the use of commutation-books removed. The punch-marks in the cover indicate the stations between which the passenger is entitled to travel in such a manner that they cannot be altered by erasure and insertion, and each one of the coupons contains a record of the stations for which the coupon is sold, so that the transfer of the coupons of a short-distance book to the covers of a long-distance book would not deceive the conductor. A complete record of the transaction is furnished to the auditor with each coupon, and no work is required on the part of the conductors beyond that of lifting the coupon, thus reducing the work of the conductors and avoiding all risk of mistake or fraud.

If the road has a large number of commutation-stations, it may be found desirable to indicate the stations upon the coupons in the manner shown in Fig. 5, the stations being listed upon the covers by numbers and names, but upon the coupons by numbers only, so that a large number of stations may thus be indicated upon a small coupon.

Instead of making the coupons independent leaves and binding them in the book, they may be printed on a continuous strip arranged to fold together, as shown in Fig. 6, so that the stations may be punched simultaneously, as in the constructions previously described. This construction, however, will be found desirable only for books limited to a small number of rides.

Other modifications of the construction will readily suggest themselves to those skilled in the art. It will be understood that while it is preferable that the stations should be indicated by punching, as less readily changed, they may be indicated in any other manner.

What I claim is—

1. A coupon commutation-book having its body and each of its coupons provided with a list of commutation-stations, substantially as and for the purpose described.

2. A coupon commutation-book having its body provided with a list of commutation-stations by names and numbers and each of its coupons provided with a list of commutation-stations by numbers, substantially as and for the purpose described.

In testimony whereof I have hereunto set my hand in the presence of two subscribing witnesses.

WILLIAM H. CAMPBELL.

Witnesses:
THOMAS F. KEHOE,
J. J. KENNEDY.